United States Patent
Lee et al.

(10) Patent No.: US 7,722,079 B2
(45) Date of Patent: May 25, 2010

(54) AIRBAG CUSHION

(75) Inventors: Jung Su Lee, Gyeonggi-do (KR); Yeon Kyeong Kim, Gyeonggi-do (KR)

(73) Assignee: Hyundai Mobis Co., Ltd., Gyeonggi-Do (KR)

( * ) Notice: Subject to any disclaimer, the term of this patent is extended or adjusted under 35 U.S.C. 154(b) by 80 days.

(21) Appl. No.: 12/026,073

(22) Filed: Feb. 5, 2008

(65) Prior Publication Data

US 2009/0152850 A1    Jun. 18, 2009

(30) Foreign Application Priority Data

Dec. 13, 2007   (KR) ................... 10-2007-0130347

(51) Int. Cl.
*B60R 21/239* (2006.01)
(52) U.S. Cl. ................... 280/739; 280/743.2
(58) Field of Classification Search ............. 280/739, 280/743.2
See application file for complete search history.

(56) References Cited

U.S. PATENT DOCUMENTS

| | | | |
|---|---|---|---|
| 5,280,953 A * | 1/1994 | Wolanin et al. ............. 280/739 |
| 5,931,497 A * | 8/1999 | Fischer ..................... 280/743.1 |
| 6,371,517 B1 * | 4/2002 | Webber et al. .............. 280/736 |
| 6,648,371 B2 * | 11/2003 | Vendely et al. ............. 280/739 |
| 6,773,030 B2 * | 8/2004 | Fischer ...................... 280/739 |
| 6,932,385 B2 * | 8/2005 | Hawthorn et al. ........... 280/739 |
| 7,066,486 B2 | 6/2006 | Lee |
| 7,147,248 B2 | 12/2006 | Lee |
| 7,261,319 B2 * | 8/2007 | DePottey et al. ............ 280/739 |
| 7,445,237 B2 * | 11/2008 | Boyle et al. ................. 280/739 |
| 7,494,151 B2 * | 2/2009 | Maripudi .................... 280/739 |
| 7,497,469 B2 * | 3/2009 | Fischer et al. ............. 280/743.2 |
| 2004/0012179 A1 * | 1/2004 | Pinsenschaum et al. ..... 280/739 |
| 2004/0017069 A1 * | 1/2004 | Fischer ....................... 280/739 |
| 2005/0035582 A1 | 2/2005 | Kim |
| 2005/0098990 A1 * | 5/2005 | Pinsenschaum et al. ..... 280/739 |
| 2005/0206138 A1 * | 9/2005 | Breuninger et al. ........ 280/729 |
| 2006/0151979 A1 * | 7/2006 | DePottey et al. ............ 280/739 |
| 2007/0035115 A1 | 2/2007 | Kim |
| 2007/0057498 A1 | 3/2007 | Koh |
| 2007/0108750 A1 * | 5/2007 | Bauer et al. ................. 280/740 |
| 2007/0170709 A1 * | 7/2007 | Braun et al. ................ 280/739 |
| 2008/0007038 A1 * | 1/2008 | Fischer et al. ............. 280/743.2 |
| 2008/0073892 A1 * | 3/2008 | Rose et al. .................. 280/739 |
| 2008/0079250 A1 * | 4/2008 | Boyle et al. ................. 280/739 |
| 2008/0179866 A1 * | 7/2008 | Maertens .................... 280/739 |
| 2008/0203713 A1 * | 8/2008 | McFadden et al. .......... 280/739 |
| 2008/0217892 A1 * | 9/2008 | Maripudi et al. ............ 280/740 |
| 2009/0224518 A1 * | 9/2009 | Lim ......................... 280/728.3 |

* cited by examiner

*Primary Examiner*—Paul N. Dickson
*Assistant Examiner*—Barry Gooden, Jr.
(74) *Attorney, Agent, or Firm*—Greenblum & Bernstein P.L.C.

(57) ABSTRACT

The present invention relates to an airbag cushion for protecting a driver and passengers when a vehicle crashes, wherein the sliding bent is guided into a belt guider and slides between a deployment portion and the belt guider, when the deployment portion is deployed. The sliding belt slides between the deployment portion and the belt guider in such a manner that before the deployment portion is deployed, the sliding belt clogs the first vent holes, when the deployment portion is partially deployed, the second vent hole forms a flow channel together with the first vent holes so that the gas is discharged along the flow channel through the first vent holes, and when the deployment portion is fully deployed, the sliding belt clogs the first vent holes so that the gas is not discharged through the first vent holes.

7 Claims, 6 Drawing Sheets

AIRBAG CUSHION

This Nonprovisional application claims priority under 35 U.S.C. §119(a) on Patent Application No. 10-2007-0130347 filed in Korea on Dec. 13, 2007, the entire contents of which are hereby incorporated by reference.

BACKGROUND OF THE INVENTION

1. Field of the Invention

The present invention relates to an airbag cushion for protecting a driver and passengers when a vehicle crashes.

2. Discussion of Related Art

In recent years, consumers attach importance to the safety of a vehicle as well as the performance or design of the vehicle when selecting the vehicle. In line with this trend, vehicle manufacturers set an important goal for technology development in order to secure the safety of a vehicle. In this technology development circumstance, an airbag module has recently been in the spotlight of means for improving the safety of passengers when a vehicle collides. Active research has been done in the airbag module. In recent years, there is a tendency that the airbag module becomes an indispensable item for a vehicle.

When a vehicle crashes, the airbag module is adapted to deploy before a passenger collides against internal structures of the vehicle and consume the kinetic energy of the passenger by employing the elasticity of the airbag cushion, thus protecting the passenger. However, a pressure when the airbag cushion is deployed is very high and, therefore, the amount of kinetic energy when the airbag cushion is deployed is very great. If the kinetic energy is transferred to the passenger without change, the passenger can suffer injury due to the airbag cushion. It is therefore necessary to properly control the pressure within the airbag cushion.

However, if the pressure of the airbag cushion is too lowered, the airbag cushion may be difficult to penetrate the panel of the driver seat or the passenger seat and then deploy. In this case, the airbag cushion may not be deployed at an appropriate time because a speed at which the airbag cushion is deployed is too slow. For this reason it is preferred that the pressure when the airbag cushion is deployed be actively controlled. Accordingly, there is a need for means for actively controlling the pressure when the airbag cushion is deployed.

SUMMARY OF THE INVENTION

Accordingly, the present invention has been made in view of the above problems occurring in the prior art, and it is an object of the present invention to provide means for actively controlling a pressure when an airbag cushion is deployed.

To accomplish the above object, an airbag cushion according to an aspect of the present invention includes a deployment portion deployed by an incoming gas and having a pressure control vent hole formed therein; a belt guider attached to the deployment portion and having first vent holes formed therein so that the gas introduced to the deployment portion can be discharged to the outside through the pressure control vent hole when the deployment portion is deployed; and a sliding belt in which a second vent hole corresponding to the first vent holes is formed, wherein the sliding bent is guided into the belt guider and slides between the deployment portion and the belt guider, when the deployment portion is deployed. The sliding belt may slide between the deployment portion and the belt guider in such a manner that before the deployment portion is deployed, the sliding belt clogs the first vent holes, when the deployment portion is partially deployed, the second vent hole may form a flow channel together with the first vent holes so that the gas is discharged along the flow channel through the first vent holes, and when the deployment portion is fully deployed, the sliding belt may clog the first vent holes so that the gas is not discharged through the first vent holes.

In the sliding belt included in the airbag cushion, when the deployment portion is deployed, the sliding belt may be fixed to the deployment portion so that expansive force of the deployment portion is converted into tension acting on the sliding belt.

The sliding belt may include clamping portions at its both ends, the clamping portions being attached to the deployment portion so that the sliding belt is fixed to the deployment portion. The sliding belt may have clamping holes formed therein between the clamping portions. Further, the airbag cushion may be supported by an airbag cushion retainer having clamping pins. Before the airbag cushion is deployed, the sliding belt may be disposed in a folded state so that the clamping holes are latched to the clamping pins and fixed thereto. In addition, in this structure, when the airbag cushion is deployed, the tension may act on the sliding belt and, therefore, the sliding belt may slide between the belt guider and the deployment portion while the clamping holes are broken.

Meanwhile, an airbag cushion according to another aspect of the present invention includes a deployment portion deployed by an incoming gas and having a pressure control vent hole formed therein; a belt guider attached to the deployment portion and having first vent holes formed therein so that the gas introduced to the deployment portion can be discharged to the outside through the pressure control vent hole when the deployment portion is deployed; and a sliding belt having a second vent hole formed therein corresponding to the first vent holes and fixed to the deployment portion in a state where part of the sliding belt is folded in such a manner that when the deployment portion is deployed, expansive force acting on the deployment portion is converted into tension and the sliding belt slides between the deployment portion and the belt guider at a specific distance. The sliding belt may open the first vent holes before the deployment portion is deployed so that the second vent hole forms a flow channel along which the gas introduced to the deployment portion is discharged together with the first vent holes, and slide between the deployment portion and the belt guider when the deployment portion is deployed so that the sliding belt clogs the first vent holes.

Meanwhile, an airbag cushion according to still another aspect of the present invention includes a deployment portion deployed by an incoming gas and having a pressure control vent hole formed therein; a belt guider attached to the deployment portion and having first vent holes formed therein so that the gas introduced to the deployment portion can be discharged to the outside through the pressure control vent hole when the deployment portion is deployed; and a sliding belt having a second vent hole formed therein corresponding to the first vent holes and fixed to the deployment portion in a state where part of the sliding belt is folded in such a manner that when the deployment portion is deployed, expansive force acting on the deployment portion is converted into tension and the sliding belt slides between the deployment portion and the belt guider at a specific distance. The sliding belt may clog the first vent holes before the deployment portion is deployed, and slide between the deployment portion and the belt guider when the deployment portion is deployed so that the second vent hole forms a flow channel along which the gas is discharged through the first vent holes together with the first vent holes.

The belt guider and the sliding belt may be attached to an exterior of the deployment portion.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE INVENTION

Figure 1:
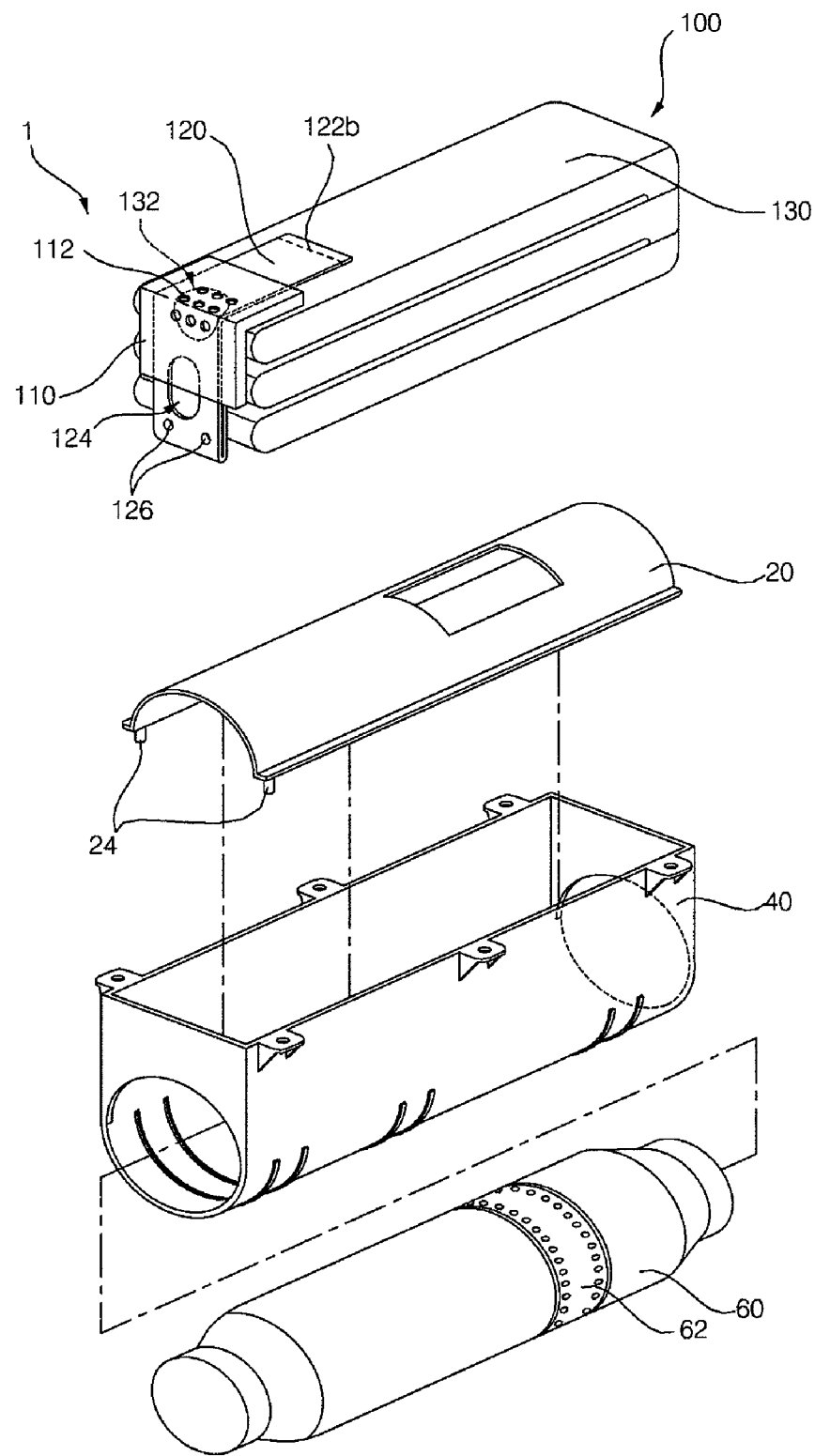
FIG. 1 is a dismantled perspective view of an airbag module according to a first embodiment of the present invention.

The present invention will now be described in detail in connection with specific embodiments with reference to the accompanying drawings.

A first embodiment of the present invention is described below with reference to FIGS. 1 to 4.

An airbag module 1 of the present embodiment includes an airbag cushion 100 that is deployed at a high speed by an incoming gas when a vehicle crashes, an inflator 60 for supplying the gas of a high pressure, which is caused by explosive power due to a chemical reaction when the vehicle crashes, to the airbag cushion 100 through a gas discharge unit 62, thereby deploying the airbag cushion, a housing 40 for receiving the inflator 60, a cushion support 20 which supports the airbag cushion 100 and has clamping pins 24 latched to clamping holes 126 formed in a sliding belt 120, and so on.

The airbag cushion 100 includes a deployment portion 130, a belt guider 110, and a sliding belt 120. The deployment portion 130 is deployed by the pressure of the gas supplied from the inflator 60 and has a pressure control vent hole 132 formed therein. The belt guider 110 is attached to the deployment portion 130 and has first vent holes 112 formed therein. The first vent holes 112 functions to discharge the incoming gas of the deployment portion 130 to the outside through the pressure control vent hole 132 when the deployment portion 130 is deployed. The sliding belt 120 includes a second vent hole 124 formed corresponding to the first vent holes 112, and it is guided into the belt guider 110 and then slides between the deployment portion 130 and the belt guider 110, when the deployment portion 130 is deployed. The sliding belt 120 further includes the clamping holes 126 to which the clamping pins 24 formed in the cushion support 20 are latched.

The deployment portion 130 can be folded and mounted when it is disposed in the form of the airbag module 1. The deployment portion 130 may further include a vent hole 134 (refer to FIG. 4) other than the pressure control vent hole 132 in order to prevent it from being torn due to the continuous supply of the gas from the inflator 60.

Further, the belt guider 110 can be partially needled and attached to the exterior of the deployment portion 130. Since only part of the belt guider 110 is needled, a space in which the sliding belt 120 can slide is formed between the belt guider 110 and the deployment portion 130. Meanwhile, it is preferred that the belt guider 110 be attached to the exterior of the deployment portion 130 in terms of work efficiency and safe deployment of the airbag cushion. However, according to the present invention, the belt guider 110 may also be attached to the interior of the deployment portion 130.

It is also preferred that the sliding belt 120 be fixed to the exterior of the deployment portion 130 so that expansive force of the deployment portion 130 is converted into tension of the sliding belt 120 when the deployment portion 130 is deployed by the gas supplied from the inflator 60. However, as described above, the fixed position of the sliding belt 120 is not limited to only the exterior of the deployment portion 130.

A detailed example for realizing this function is described below. The sliding belt 120 includes first and second clamping portions 122a and 122b for enabling both ends of the sliding belt 120 to be attached to the deployment portion 130. The first and second clamping portions 122a and 122b may be attached to the deployment portion 130 using a needling method. Meanwhile, the sliding belt 120 can slide freely between the deployment portion 130 and the belt guider 110 since it is not attached to the deployment portion 130 except for the first and second clamping portions 122a and 122b.

Further, a relative position of the first and second clamping portions 122a and 122b and the deployment portion 130 is decided in such a manner that expansive force of the deployment portion 130 is transferred to the first and second clamping portions 122a and 122b and then converted into tension acting on the sliding belt 120 when the deployment portion 130 is deployed. In other words, when the deployment portion 130 is folded, the second clamping portion 122b of the sliding belt 120 is attached to the deployment portion 130 with the sliding belt 120 being not folded, and the first clamping portion 122a of the sliding belt 120 is attached to the deployment portion 130 with the sliding belt 120 being partially folded.

If the sliding belt 120 is fixed to the deployment portion 130 in this manner, the folded portion of the deployment portion 130 is unfolded when the gas is introduced to the deployment portion 130 and the deployment portion 130 is expanded, and a distance between the clamping portions 122a and 122b is more increased due to the expansion of the deployment portion 130 than a distance between the clamping portions 122a and 122b before the folded portion of the deployment portion 130 is unfolded. The sliding belt 120 near the first clamping portion 122a is unfolded as much as the increased distance, so the sliding belt 120 slides in the direction of an arrow indicated in FIGS. 3 and 4.

Further, the clamping holes 126 are formed at the folded portion near the first clamping portion 122a. If the clamping holes 126 are formed as described above, the folded portion of the sliding belt 120 is not twisted and can be positioned at appropriate positions with them being folded.

Meanwhile, the disposition of the sliding belt 120 and a relative position between the clamping portions 122a and 122b and the deployment portion 130 are only illustrative. A method in which the sliding belt 120 slides between the belt guider 110 and the deployment portion 130 may be various.

Figure 2:
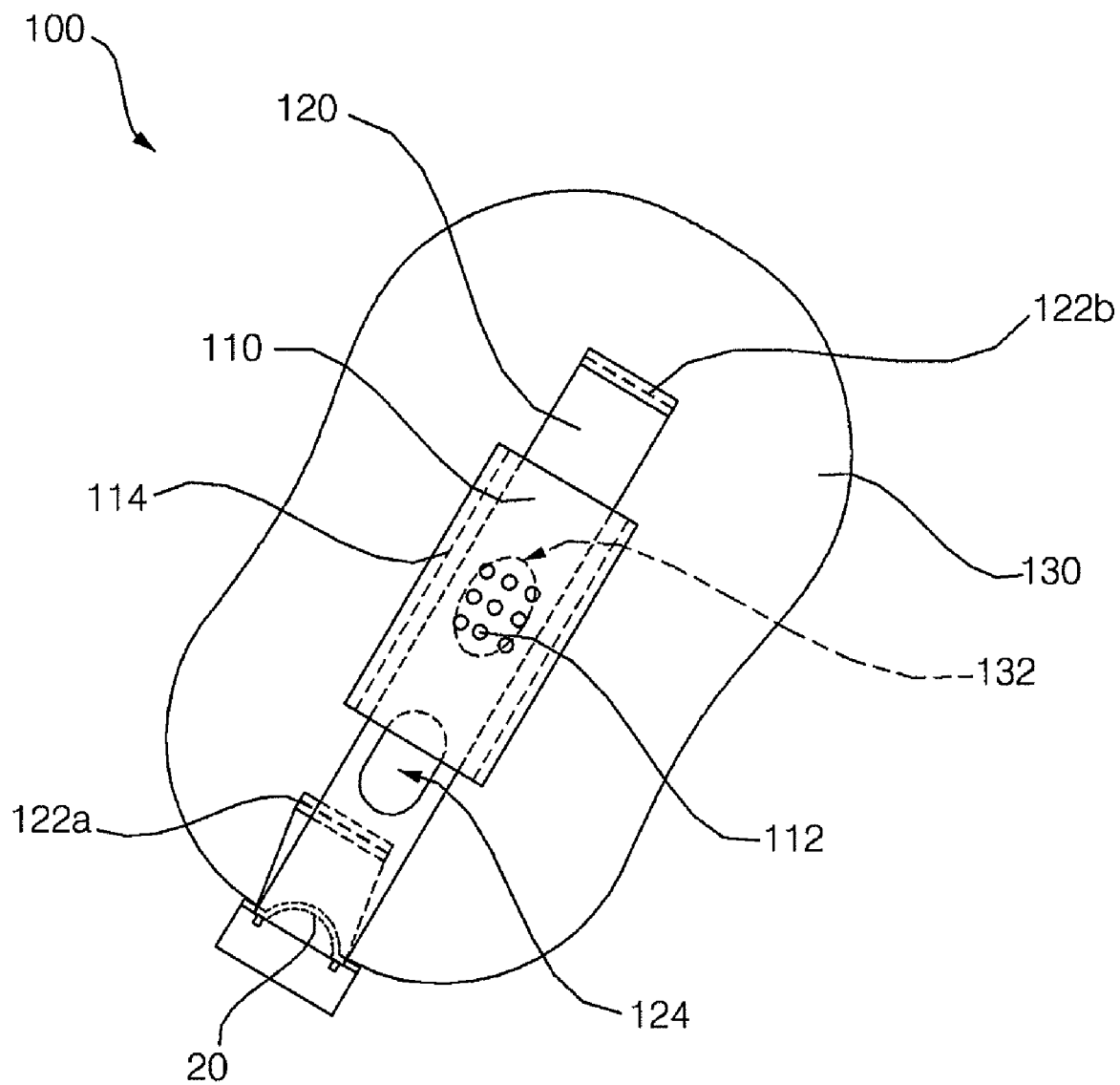
FIG. 2 is a lateral view showing a relative position of a belt guider and a sliding belt when the airbag cushion is deployed according to a first embodiment of the present invention.
Figure 3:
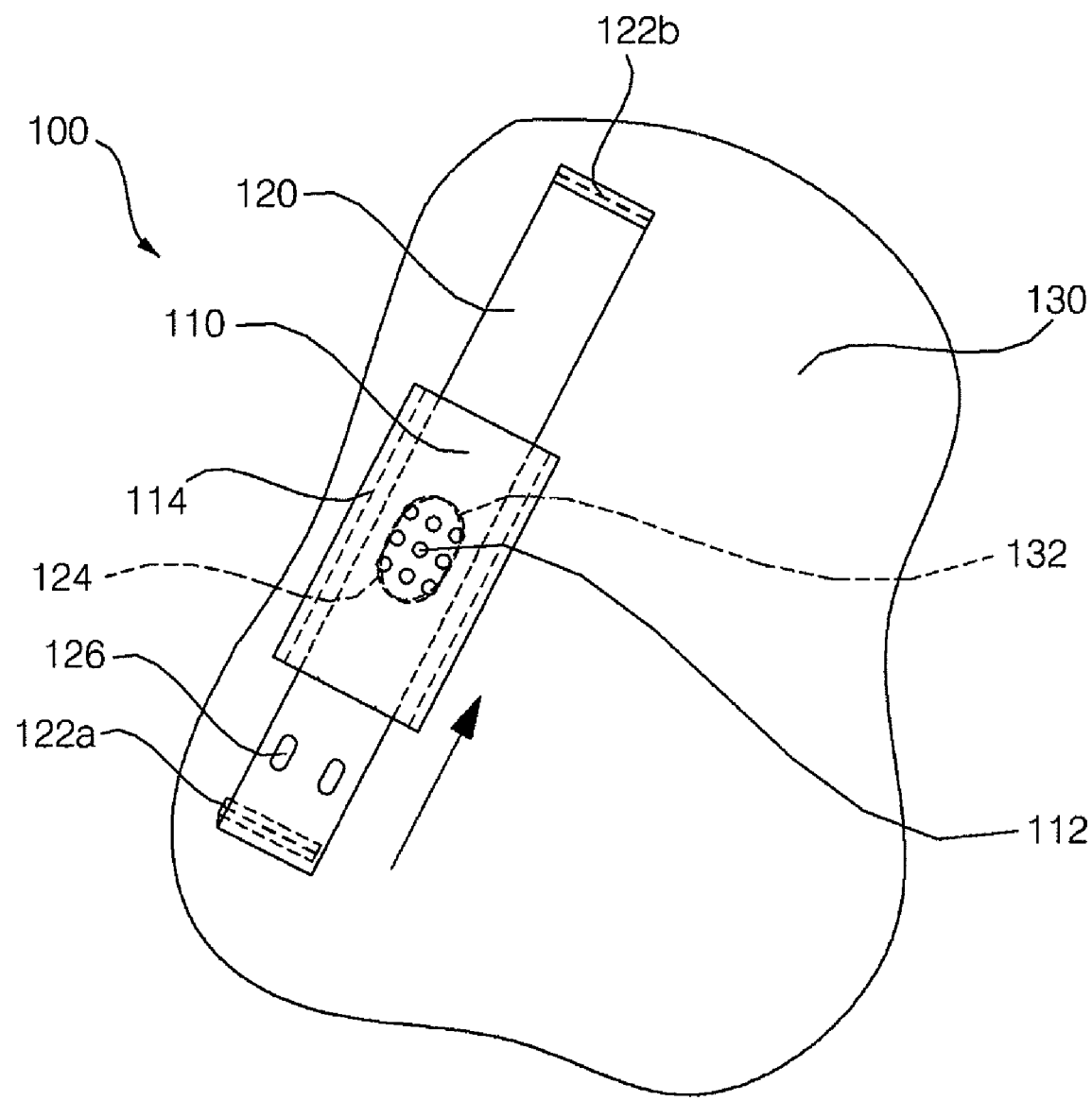
FIG. 3 is a lateral view showing a relative position of the belt guider and the sliding belt when the airbag cushion is partially deployed according to a first embodiment of the present invention.
Figure 4:
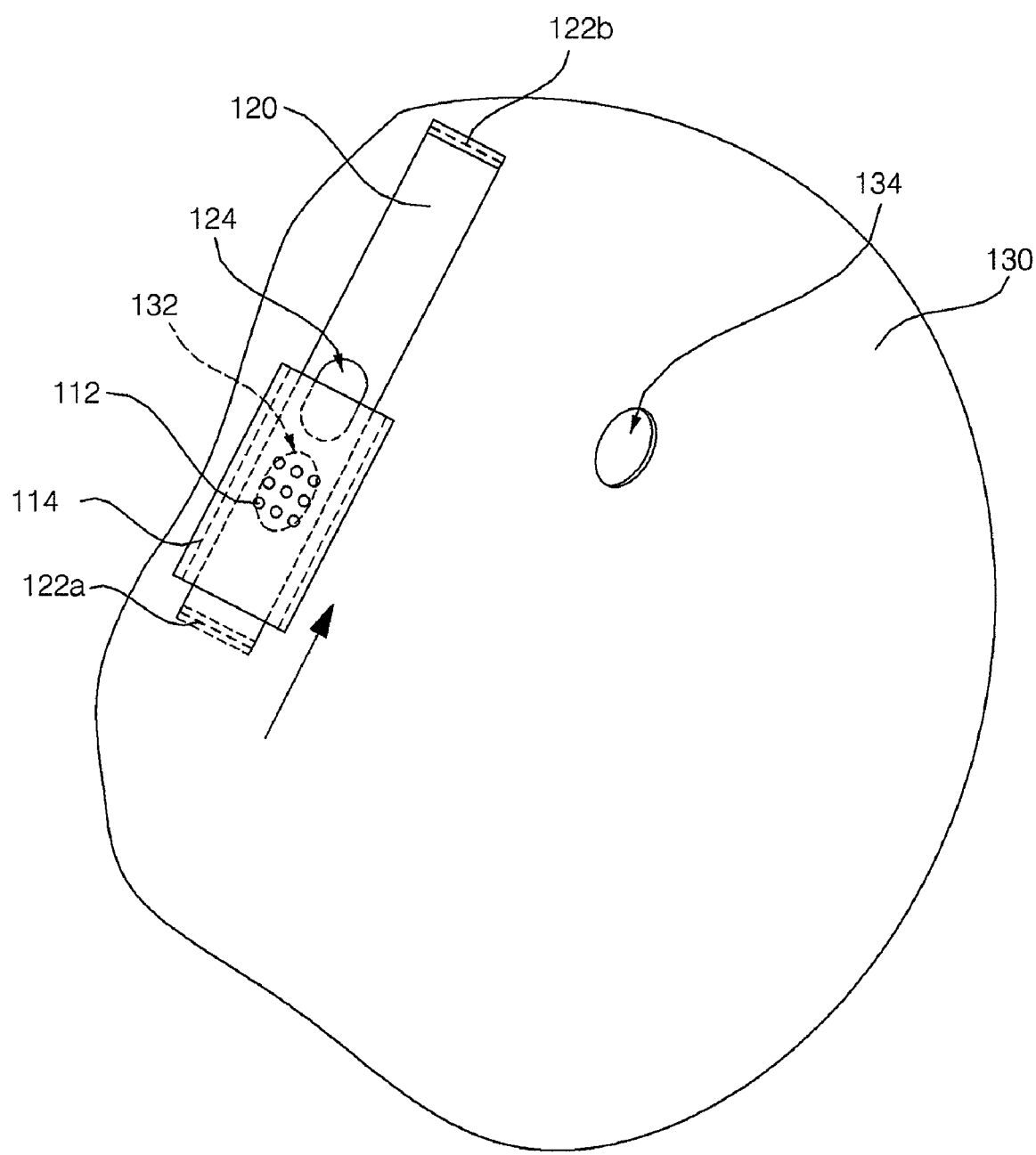
FIG. 4 is a lateral view showing a relative position of the belt guider and the sliding belt when the airbag cushion is fully deployed according to a first embodiment of the present invention.

A relative position between the pressure control vent hole 132, the first vent holes 112, and the second vent hole 124 while the deployment portion 130 is deployed by an incoming gas is described below with reference to FIGS. 2 to 4.

If a gas is introduced to the deployment portion 130, the deployment portion 130 pushes a structure, which is mounted in the driver's seat, the passenger seat, etc. and covers the airbag cushion module 1, by means of expansive force of the gas, so the deployment portion 130 can be deployed. In order to secure an enough pressure to push the structure, it is preferred that an amount in which the gas introduced to the deployment portion 130 is discharged to the outside be minimal. To this end, when the deployment portion 130 is deployed, the sliding belt 120 is placed at a position where the sliding belt 120 clogs the pressure control vent hole 132 and the first vent holes 112 formed in the deployment portion 130 and the belt guider 110. In order for the sliding belt 120 to be placed at the position where it clogs the pressure control vent hole 132 and the first vent holes 112 for a certain period of time while the deployment portion 130 is deployed, the clamping holes 126 formed in the sliding belt 120 prevent the sliding belt 120 from sliding in a state where they are latched to the clamping pins 24 of the cushion retainer 20.

Thereafter, if the amount of the incoming gas within the deployment portion 130 is increased and therefore expansive force of the deployment portion 130 is increased, stress is concentrated on the clamping holes 126, which are then torn. Accordingly, the clamping holes 126 deviate from the clamping pins 24, so the sliding belt 120 slides between the belt guider 110 and the deployment portion 130. If the sliding belt 120 slides as described above, the second vent hole 122 formed in the sliding belt 120 is aligned in parallel to the pressure control vent hole 132 and the first vent holes 112, thereby forming a flow channel along which the gas within the deployment portion can be discharged to the outside.

Further, the sliding belt 120 can maintain its position for a short period of time by means of the pressure in which the gas within the deployment portion is discharged to the outside through the pressure control vent hole 132, the first vent holes 112, and the second vent hole. Further, when the sliding belt 120 is placed at the above position, part of the incoming gas within the deployment portion 130 is discharged to the outside, so that the pressure within the deployment portion 130 can be reduced. It functions to reduce the kinetic energy of the deployment portion when the deployment portion 130 is deployed.

Meanwhile, in the event that a passenger rides in a vehicle at an abnormal seating position where the passenger can directly experience impulsive force generated by the deployment of the deployment portion 130 and the deployment portion 130 is deployed due to a vehicle accident in this state, when the passenger collides against the deployment portion 130 before the deployment portion is fully deployed, the passenger can suffer injuries from the kinetic energy generated when the deployment portion 130 is deployed.

However, in the event that the passenger collides against the deployment portion at an abnormal seating position, if the sliding belt 120, the deployment portion 130, and so on are designed so that the crash time is identical to the time point where the sliding belt 120 is placed at the above position (refer to FIG. 3), the injury of the passenger due to the kinetic energy of the deployment portion can be minimized.

When the gas is continuously supplied to the deployment portion 130 and the deployment portion is fully deployed, the sliding belt 120 slides between the deployment portion 130 and the belt guider 110 so that the folded portion thereof is fully unfolded. The sliding belt 120 slides and clogs the pressure control vent hole 132 and the first vent holes 112. At this time, if this time point becomes identical to the time point at which the passenger collides against the airbag cushion 100 at a normal seating position state, the pressure within the deployment portion 130 can be maintained sufficiently and therefore elastic force of the deployment portion 130 can be secured sufficiently.

Meanwhile, the deployment portion 130 further includes the vent hole 134 for preventing the deployment portion 130 from bursting due to the continuous supply of the gas to the inflator 60, as well as the pressure control vent hole 132. Accordingly, there is no problem that the deployment portion 130 bursts even though the pressure control vent hole 132 is clogged.

Figure 5:
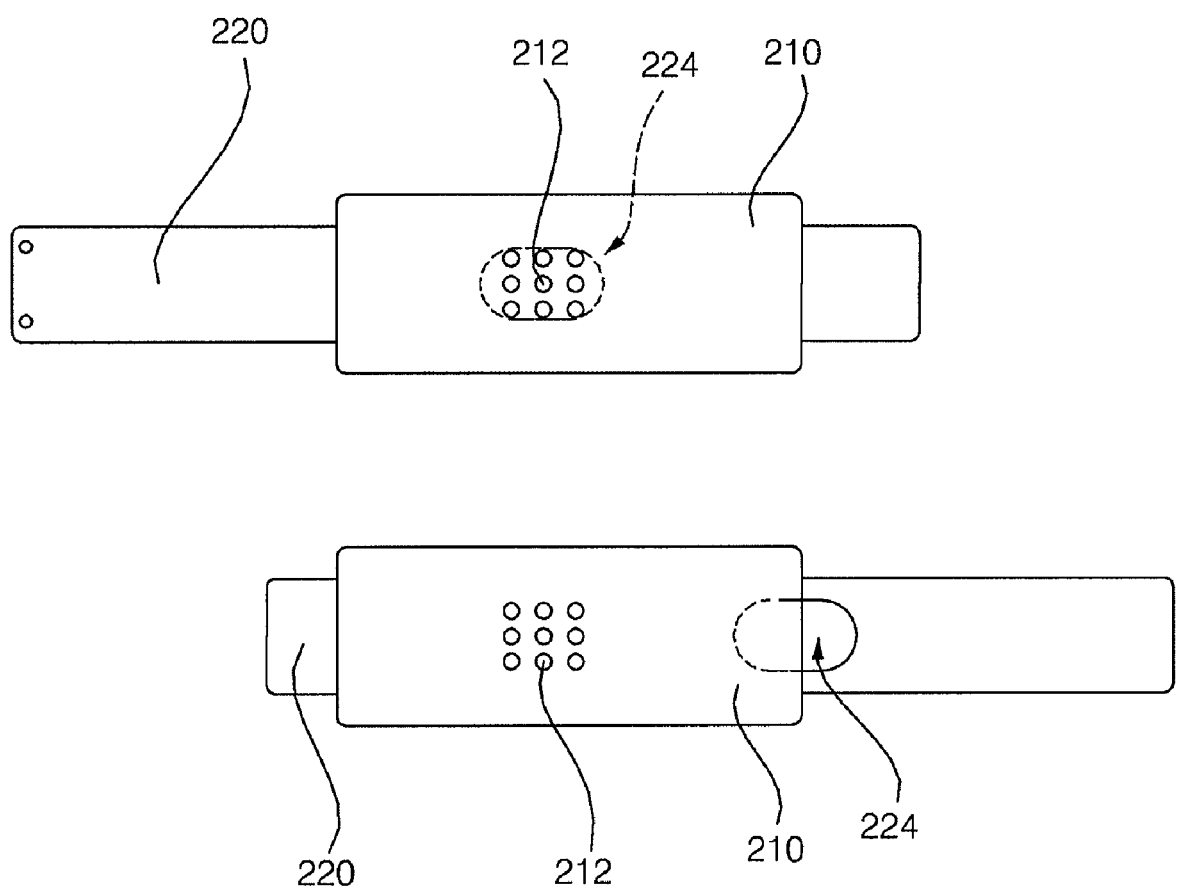
FIG. 5 is a schematic view showing only a relative position of a belt guider and a sliding belt in a process in which an airbag cushion is deployed according to a second embodiment of the present invention.

An airbag cushion according to a second embodiment of the present invention is described below with reference to FIG. 5.

The airbag cushion of the present embodiment has substantially the same construction as that of the airbag cushion 100 according to the first embodiment of the present invention except that a relative position of a belt guider 210 and a sliding belt 220 is different from that of the airbag cushion 100 according to the first embodiment of the present invention, and redundant description thereof is omitted.

The airbag cushion of the present embodiment also includes a deployment portion, the belt guider 210, and the sliding belt 220. The belt guider is attached to the exterior of the deployment portion, and has first vent holes 212 formed therein, through which a gas introduced to the deployment portion is discharged to the outside through a pressure control vent hole when the deployment portion is deployed. The sliding belt has a second vent hole 224 formed therein corresponding to the first vent holes 212 and is fixed to the exterior of the deployment portion with it being partially folded so that it slides between the deployment portion and the belt guider 210 at a specific distance due to the conversion of expansive force acting on the deployment portion into tension when the deployment portion is deployed.

Further, the sliding belt 220 opens the first vent holes 212 before the deployment portion is deployed such that the second vent hole 224 forms a flow channel along which the gas introduced into the deployment portion is discharged together with the first vent holes 212, but slides between the deployment portion and the belt guider when the deployment portion is deployed so that the sliding belt 220 clogs the first vent holes 212. This relative position of the sliding belt 220 and the belt guider 210 is a design that may be considered when an initial pressure is short since the pressure of the inflator is not sufficient.

Figure 6:
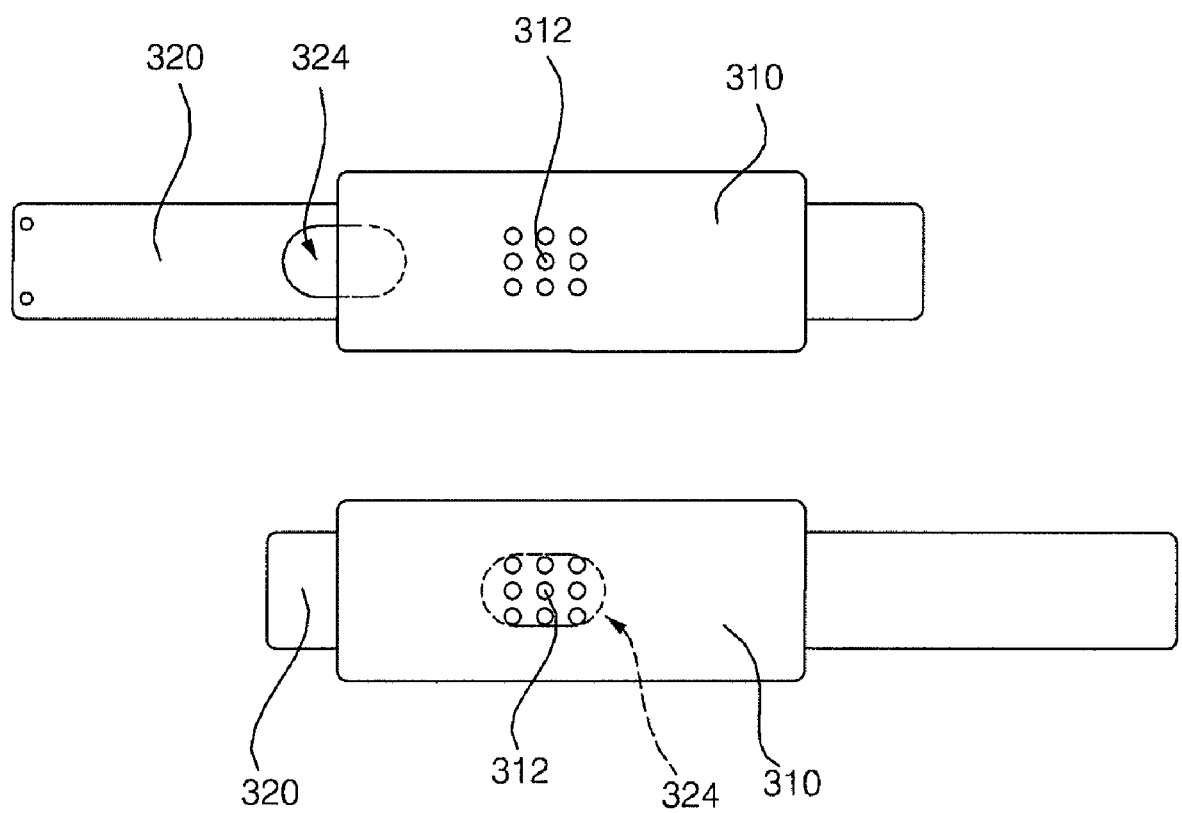
FIG. 6 is a schematic view showing only a relative position of a belt guider and a sliding belt in a process in which an airbag cushion is deployed according to a third embodiment of the present invention.

An airbag cushion according to a third embodiment of the present invention is described below with reference to FIG. 6.

The airbag cushion of the present embodiment has substantially the same construction as that of the airbag cushion 100 according to the first embodiment of the present invention except that a relative position of a belt guider 310 and a sliding belt 320 is different from that of the airbag cushion 100 according to the first embodiment of the present invention, and redundant description thereof is omitted.

The airbag cushion of the present embodiment includes a deployment portion having a pressure control vent hole formed therein, the belt guider 310, and the sliding belt 320. The belt guider is attached to the exterior of the deployment portion, and has first vent holes 312 formed therein, through which a gas introduced to the deployment portion is discharged to the outside through the pressure control vent hole when the deployment portion is deployed. The sliding belt has a second vent hole 324 formed therein corresponding to the first vent holes 312 and is fixed to the exterior of the deployment portion with it being partially folded so that it slides between the deployment portion and the belt guider 310 at a specific distance due to the conversion of expansive force acting on the deployment portion into tension when the deployment portion is deployed.

The sliding belt 320 clogs the first vent holes 312 before the deployment portion is deployed, but slides between the deployment portion and the belt guider 310 when the deployment portion is deployed such that the second vent hole 324 forms a flow channel along which a gas is discharged through the first vent holes 312 together with the first vent holes 312. This relative position of the sliding belt 320 and the belt guider 310 is a design that may be considered when an excessive pressure is introduced from the inflator at an early stage and peripheral devices may be damaged.

The present invention is available for technology development of an airbag cushion for securing the safety of a passenger when a vehicle crashes.

As described above, the present invention may have the following advantages.

First, an enough pressure to penetrate the panel of a driver's seat or a passenger seat in which the airbag cushion is mounted can be secured.

Second, when a passenger is seated in a vehicle seat abnormally, the passenger can be prevented from suffering injury due to the deployment of the airbag cushion.

Third, a sufficient speed at which the airbag cushion is deployed can be secured.

Fourth, elastic force enough to absorb shock generated when the airbag cushion is deployed can be secured.

Fifth, it is possible to control a pressure generated when the airbag cushion is deployed, which can satisfy various conditions through some modifications.

Sixth, means for controlling a pressure generated when the airbag cushion is deployed is disposed outside the airbag cushion. Accordingly, the process is convenient, hindrance to internal structures can be prevented, and reliability in pressure control of the airbag cushion can be secured.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An airbag cushion, comprising:
   a deployment portion deployed by an incoming gas and having a pressure control vent hole formed therein;
   a belt guider attached to the deployment portion and having first vent holes formed therein so that the gas introduced to the deployment portion can be discharged to the outside through the pressure control vent hole when the deployment portion is deployed; and
   a sliding belt in which a second vent hole corresponding to the first vent holes is formed, wherein the sliding bent is guided into the belt guider and slides between the deployment portion and the belt guider, when the deployment portion is deployed,
   wherein the sliding belt slides between the deployment portion and the belt guider in such a manner that before the deployment portion is deployed, the sliding belt clogs the first vent holes, when the deployment portion is partially deployed, the second vent hole forms a flow channel together with the first vent holes so that the gas is discharged along the flow channel through the first vent holes, and when the deployment portion is fully deployed, the sliding belt clogs the first vent holes so that the gas is not discharged through the first vent holes,
   wherein the sliding belt comprises clamping portions at both ends, the clamping portions being attached to the deployment portion so that the sliding belt is fixed to the deployment portion, and the sliding belt has clamping holes formed therein between the clamping portions,
   wherein the airbag cushion is supported by an airbag cushion retainer having clamping pins, and
   the sliding belt is disposed in a folded state so that the clamping holes are latched to the clamping pins and fixed thereto before the airbag cushion is deployed.

2. The airbag cushion of claim 1, wherein when the airbag cushion is deployed, the tension acts on the sliding belt and, therefore, the sliding belt slides between the belt guider and the deployment portion while the clamping holes are broken.

3. The airbag cushion of claim 1, wherein the belt guider and the sliding belt are attached to an exterior of the deployment portion.

4. An airbag cushion, comprising:
   a deployment portion deployed by an incoming gas and having a pressure control vent hole formed therein;
   a belt guider attached to the deployment portion and having first vent holes formed therein so that the gas introduced to the deployment portion can be discharged to the outside through the pressure control vent hole when the deployment portion is deployed; and
   a sliding belt having a second vent hole formed therein corresponding to the first vent holes and fixed to the deployment portion in a state where part of the sliding belt is folded in such a manner that when the deployment portion is deployed, expansive force acting on the deployment portion is converted into tension and the sliding belt slides between the deployment portion and the belt guider at a specific distance,
   wherein the sliding belt opens the first vent holes before the deployment portion is deployed so that the second vent hole forms a flow channel along which the gas introduced to the deployment portion is discharged together with the first vent holes, and slides between the deployment portion and the belt guider when the deployment portion is deployed so that the sliding belt clogs the first vent hole,
   wherein the sliding belt comprises clamping portions at both ends, the clamping portions being attached to the deployment portion so that the sliding belt is fixed to the deployment portion, and the sliding belt has clamping holes formed therein between the clamping portion,
   wherein the airbag cushion is supported by an airbag cushion retainer haying clamping pins, and
   the sliding belt is disposed in a folded state so that the clamping holes are latched to the clamping pins and fixed thereto before the airbag cushion is deployed.

5. The airbag cushion of any one of claim 4, wherein the belt guider and the sliding belt are attached to an exterior of the deployment portion.

6. An airbag cushion, comprising:
   a deployment portion deployed by an incoming gas and having a pressure control vent hole formed therein;
   a belt guider attached to the deployment portion and having first vent holes formed therein so that the gas introduced to the deployment portion can be discharged to the outside through the pressure control vent hole when the deployment portion is deployed; and a sliding belt having a second vent hole formed therein corresponding to the first vent holes and fixed to the deployment portion in a state where part of the sliding belt is folded in such a manner that when the deployment portion is deployed, expansive force acting on the deployment portion is converted into tension and the sliding belt slides between the deployment portion and the belt guider at a specific distance, where the sliding belt clogs the first vent holes before the deployment portion is deployed, and slides between the deployment portion and the belt guider when the deployment portion is deployed so that the second vent hole forms a flow channel along which the gas is discharged through the first vent holes together with the first vent holes, wherein the sliding belt comprises clamping portions at both ends, the clamping portions being attached to the deployment portion so that the sliding belt is fixed to the deployment portion, and the sliding belt has clam in holes formed therein between the clamping portions, wherein the airbag cushion is supported by an airbag cushion retainer having clamping pins, and the sliding belt is disposed in a folded state so that the clamping holes are latched to the clamping pins and fixed thereto before the airbag cushion is deployed.

7. The airbag cushion of any one of claim 6, wherein the belt guider and the sliding belt are attached to an exterior of the deployment portion.

* * * * *